United States Patent
Nainar et al.

(10) Patent No.: US 11,038,790 B2
(45) Date of Patent: Jun. 15, 2021

(54) FAILURE DETECTIONS IN POINT-TO-MULTIPOINT PACKET-FORWARDING NETWORKS

(71) Applicant: Cisco Technology, Inc., San Jose, CA (US)

(72) Inventors: Nagendra Kumar Nainar, Morrisville, NC (US); Carlos M. Pignataro, Cary, NC (US); IJsbrand Wijnands, Leuven (BE)

(73) Assignee: Cisco Technology, Inc., San Jose, CA (US)

( * ) Notice: Subject to any disclaimer, the term of this patent is extended or adjusted under 35 U.S.C. 154(b) by 93 days.

(21) Appl. No.: 16/432,595

(22) Filed: Jun. 5, 2019

(65) Prior Publication Data
US 2020/0389385 A1    Dec. 10, 2020

(51) Int. Cl.
*G01R 31/08* (2020.01)
*H04L 1/00* (2006.01)
*H04L 12/26* (2006.01)

(52) U.S. Cl.
CPC .......... *H04L 43/50* (2013.01); *H04L 43/0823* (2013.01)

(58) Field of Classification Search
CPC .......................... H04L 43/50; H04L 43/0823
See application file for complete search history.

(56) References Cited

U.S. PATENT DOCUMENTS

| | | | | |
|---|---|---|---|---|
| 2009/0037713 A1* | 2/2009 | Khalid | ................ | H04L 12/4633 713/1 |
| 2013/0144906 A1* | 6/2013 | Bhupalam | ............ | H04N 21/262 |
| 2015/0029872 A1* | 1/2015 | Pignataro | ................ | H04L 45/24 370/252 |
| 2015/0138961 A1* | 5/2015 | Wijnands | ................ | H04L 45/22 370/228 |

(Continued)

FOREIGN PATENT DOCUMENTS

| | | |
|---|---|---|
| EP | 3242441 A1 | 11/2017 |
| EP | 3422643 A1 | 1/2019 |

OTHER PUBLICATIONS

Yoann et al. (reliable multicast with B.I.E.R, Apr. 2018) (Year: 2018).*

(Continued)

*Primary Examiner* — Maharishi V Khirodhar
(74) *Attorney, Agent, or Firm* — Baker Botts, LLP (57) ABSTRACT

In one embodiment, a method includes identifying a number of target network apparatuses within a network to which a first network apparatus belongs, generating a first message including a reply-required indication and encoded identities for the plurality of target network apparatuses, sending the first message through the network, where the network is configured to deliver a copy of the first message to each of the target network apparatuses using a point-to-multipoint packet-forwarding architecture, receiving one or more second messages from one or more of the target network apparatuses, respectively, where each of the one or more (Continued)

second messages is generated as a reply to the first message by one of the one or more target network apparatuses, and identifying which of the plurality of target network apparatuses failed to respond to the first message based on the received one or more second messages.

15 Claims, 7 Drawing Sheets

(56) References Cited

U.S. PATENT DOCUMENTS

2016/0127142 A1* 5/2016 Tian ................... H04L 12/1886
370/390
2017/0126481 A1* 5/2017 Pignataro ................ H04L 45/22

OTHER PUBLICATIONS

Iternational Search Report and Written Opinion for International Application No. PCT/US2020/034496, dated Jul. 15, 2020.

* cited by examiner

FAILURE DETECTIONS IN POINT-TO-MULTIPOINT PACKET-FORWARDING NETWORKS

TECHNICAL FIELD

The present disclosure relates generally to a field of data communications, and more particularly, to failure detections in Point-to-Multipoint packet-forwarding networks.

BACKGROUND

A new stateless replication architecture, called Bit Index Explicit Replication (BIER), has been recently proposed. BIER is an optimal and scalable solution for multipoint replication by using bit-string based forwarding and by following unicast path. Numerous efforts have been made in industry to support BIER as the underlay transport mechanism for service delivery. For example, Ethernet virtual private network (EVPN) may use BIER as the underlay Point-to-Multipoint (P2MP) transport to handle Broadcast, Unknown Unicast and Multicast (BUM) traffic. Applying failure detection mechanisms such as Bidirectional Forwarding Detection (BFD) or Seamless Bidirectional Forwarding Detection (S-BFD) for P2MP scenarios such as Protocol Independent Multicast (PIM) based multicast may raise challenges on how to react to a failure. The failure may be detected by the head end while the tree needs to be built by the tail ends. BIER follows unicast path and does not require any per stream tree building from receivers (or egress) towards the sender (or ingress). The Ingress may use any available unicast path to forward the BIER encapsulated packet to Egress/Receivers. Thus, a failure detection may be easily applied to BIER resulting in rapid failure detections.

DESCRIPTION OF EXAMPLE EMBODIMENTS

Overview

In particular embodiments, a first network apparatus may identify a plurality of target network apparatuses within a network to which the first network apparatus belongs. The first network apparatus may generate a first message comprising one or more headers. The one or more headers may comprise a reply-required indication and encoded identities for the plurality of target network apparatuses. The first network apparatus may send the first message through the network. The network may be configured to deliver a copy of the first message to each of the plurality of target network apparatuses using a point-to-multipoint packet-forwarding architecture based on the encoded identities for the plurality of target network apparatuses. The first network apparatus may receive one or more second messages from one or more of the plurality of target network apparatuses, respectively. Each of the one or more second messages may be generated as a reply to the first message by one of the one or more target network apparatuses. The first network apparatus may identify which of the plurality of target network apparatuses failed to respond to the first message based on the received one or more second messages.

In particular embodiments, a second network apparatus may receive the first message from the first network apparatus. The first message may comprise one or more headers. The one or more headers may comprise encoded identities for a plurality of target network apparatuses in a network. The plurality of target network apparatuses may comprise the second network apparatus. The network may be configured to deliver the first message to the second network apparatus using a point-to-multipoint packet-forwarding architecture based on encoded identity of the second network apparatus in encoded identities. The second network apparatus may determine that the one or more headers of the first message comprise a reply-required indication. The second network apparatus may identify the first network apparatus based on the one or more headers of the first message. The second network apparatus may generate a second message comprising a payload and one or more headers. The payload of the second message may be identical to a payload of the first message. A destination field in the one or more headers of the second message may be set with an encoded identity of the first network apparatus. A source field of the one or more headers of the second message may be set with an encoded identity of the second network apparatus. The second network apparatus may send the second message through the network. The network may be configured to deliver the second message to the first network apparatus using a point-to-multipoint packet-forwarding architecture based on the encoded identity of the first network apparatus.

EXAMPLE EMBODIMENTS

Figure 1:
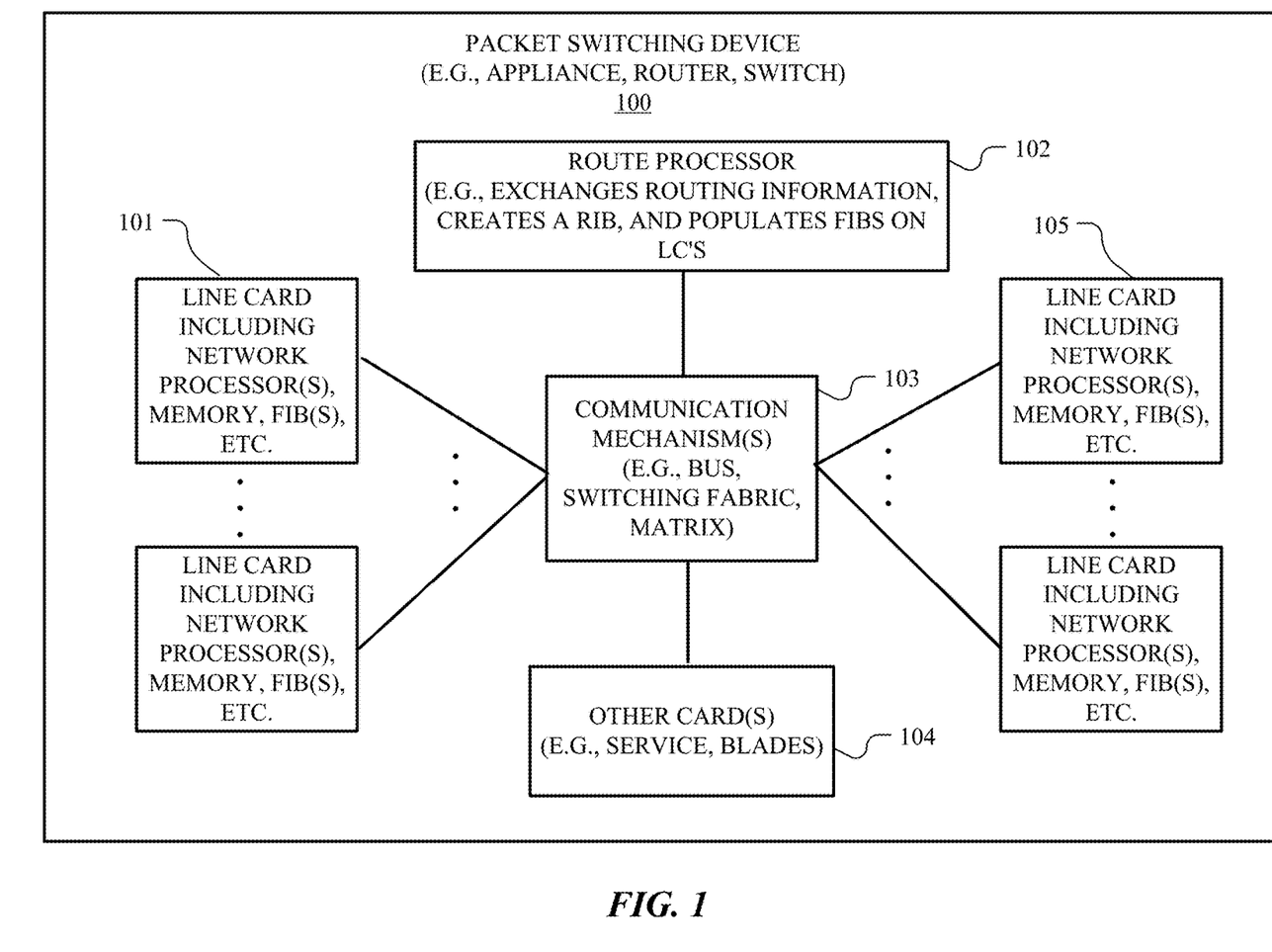
FIG. 1 illustrates an example packet switching system.

FIG. 1 illustrates an example packet switching system. In particular embodiments, a packet switching device 100 may comprise multiple line cards 101 and 105, each with one or more network interfaces for sending and receiving packets over communications links (e.g., possibly part of a link aggregation group). The packet switching device 100 may also have a control plane with one or more processing elements 102 for managing the control plane and/or control plane processing of packets associated with forwarding of packets in a network. The packet switching device 100 may also include other cards 104 (e.g., service cards, blades) which include processing elements that are used to process (e.g., forward/send, drop, manipulate, change, modify, receive, create, duplicate, apply a service) packets associated with forwarding of packets in a network. The packet switching device 100 may comprise hardware-based communication mechanism 103 (e.g., bus, switching fabric, and/or matrix, etc.) for allowing its different entities 101, 102, 104 and 105 to communicate. Line cards 101 and 105 may typically perform the actions of being both an ingress and egress line card, in regard to multiple other particular packets and/or packet streams being received by, or sent from, packet switching device 100.

In particular embodiments, a message may need to be delivered to a plurality of network apparatuses. Identities for the plurality of network apparatuses may be encoded into a destination field in a header of the message. A network may be configured to deliver a copy of a message to each of the plurality of network apparatuses using a point-to-multipoint packet-forwarding architecture based on the encoded identities for the plurality of network apparatuses in the destination field. The point-to-multipoint architecture may be Bit Index Explicit Replication (BIER). An identity of a network apparatus may be encoded into a unique bit-string. The first network apparatus may encode identities of the plurality of target network apparatuses into a destination field in the one or more headers of the first message by performing bitwise-OR operations between the bit-strings corresponding to the plurality of target network apparatuses.

Figure 2:
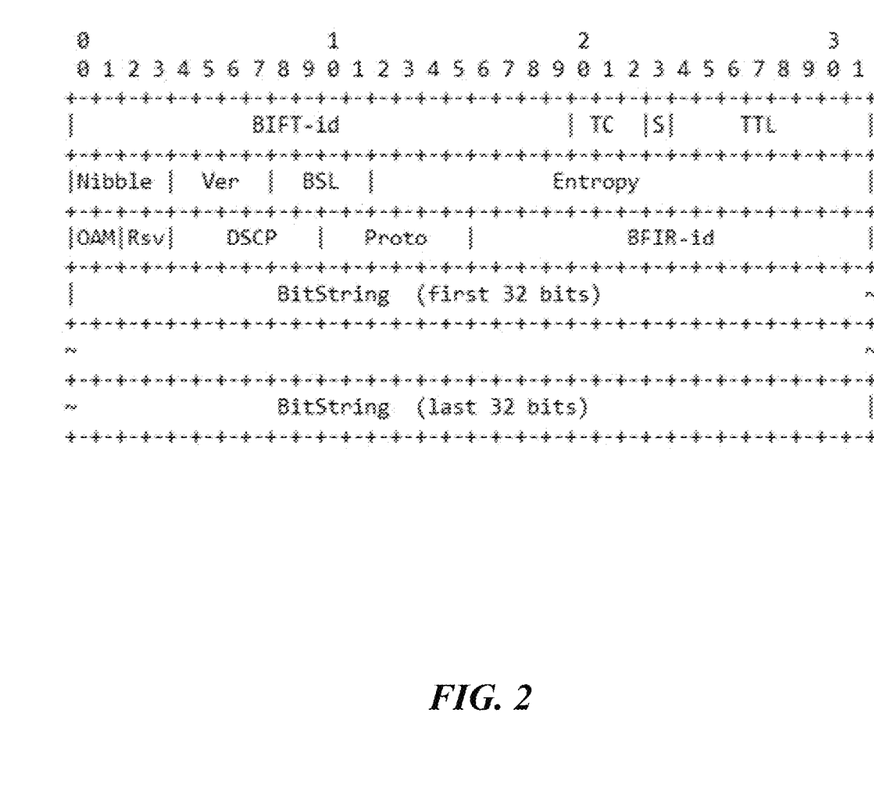
FIG. 2 illustrates an example BIER header format.

FIG. 2 illustrates an example BIER header format. A router that supports BIER is referred to as a Bit-Forwarding Router (BFR). In a BIER network, each edge Bit-Forwarding Router (BFR) may be associated with a BFR identifier (BFR-id). A BFR-id may be an integer indicating a position of a single bit in a bit string encoding the BFR-id. A BFR-id k is encoded by a bit string of zeros except the k-th bit. The value of the k-th bit in the bit string will be one. The BFR-id may uniquely identify the corresponding BFR in the network. When a Bit-Forwarding Ingress Router (BFIR) forward a message to one or more Bit-Forwarding Egress Routers (BFERs), the BFR-id of the BFIR is encoded in the 16-bit BFIR-id field of the BIER header as an unsigned integer in the range [1, 65535]. A BitString field of the BIER header identifies the destination BFERs for the message. The BFIR may determine the value of the BitString field by performing bitwise-OR operations between the bit-string encodings of BFR-ids for the one or more BFERs.

Figure 3:
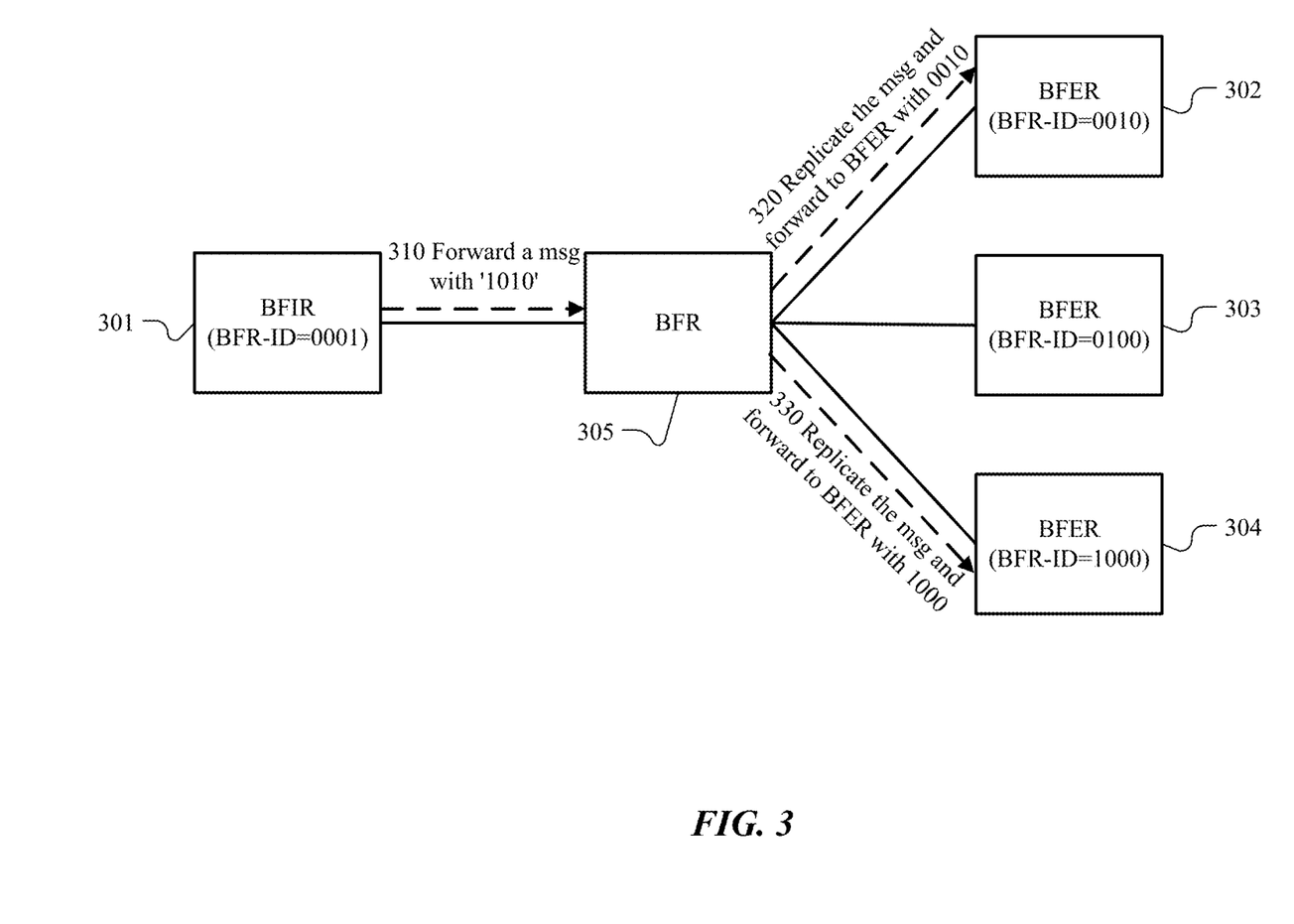
FIG. 3 illustrates an example message delivery using BIER.

FIG. 3 illustrates an example message delivery using BIER. As an example and not by way of limitation, illustrated in FIG. 3, each edge Bit-Forwarding Router (BFR) may be associated with a BFR identifier (BFR-id). In the example illustrated in FIG. 3, a BFR 301 is associated with a bit string '0001,' a BFR 302 is associated with a bit string '0010,' a BFR 303 is associated with a bit string '0100,' and a BFR 304 is associated with a bit string '1000': A Bit-Forwarding Ingress Router (BFIR) 301 may want to forward a message to more than one Bit-Forwarding Egress Routers (BFERs). The BFIR 301 may determine BFERs 302 and 304 as destined egress routers. The BFIR 301 may create a destination BFR-id '1010' by performing a bitwise-OR operation between the BFR-id '0010' associated with BFER 302 and the BFR-id '1000' associated with BFER 304. The BFIR 301 may set the created destination BFR-id '1010' to a destination field in a BIER header of the message. The value of the BFR-id in the BIER header may be '1.' At step 310, the BFIR 301 may forward the message to a connected intermediate BFR 305. On receiving the message, the BFR 305 may determine one or more forwarding paths for the message based on the destination bit string. For each egress link, the BFR 305 may perform a bitwise AND operation between a bit string associated with the egress link and the destination bit string of the message. A bit string associated with the egress link toward the BFER 302 may be '0010': Thus, the BFR 305 may perform a bitwise AND operation between '0010' and '1010' for the egress link. Because the result of the AND operation is '0010,' the BFR 305, at step 320, may replicate the received message and forward the message to BFER 302, which is associated with the BFR-id '0010': A bit string associated with the egress link toward the BFER 303 may be '0100': Thus, the BFR 305 may perform a bitwise AND operation between '0100' and '1010' for the egress link. Because the result of the AND operation is NULL, the BFR 305 may not forward the message to BFER 303. A bit string associated with the egress link toward the BFER 304 may be '1000.' Thus, the BFR 305 may perform a bitwise AND operation between '1000' and '1010' for the egress link. Because the result of the AND operation is '1000,' the BFR 305, at step 330, may replicate the received message and forward the message to BFER 304, which is associated with the BFR-id '1000.'

In particular embodiments, a first network apparatus may identify a plurality of target network apparatuses within a network to which the first network apparatus belongs. The plurality of target network apparatuses may be subjects of a failure detection. In particular embodiments, the first network apparatus may be an ingress router that needs to detect any failure at one or more egress routers. The plurality of target network apparatuses may comprise egress routers of existing multicast flows. In particular embodiments, the first network apparatus may be an operations, administration and maintenance (OAM) server. The OAM server may need to detect a failure at any egress router as soon as possible. In such a case, the plurality of target network apparatuses may comprise all the edge BFRs in the network. Although this disclosure describes identifying target network apparatuses of a failure detection in a particular manner, this disclosure contemplates identifying target network apparatuses of a failure detection in any suitable manner.

In particular embodiments, the first network apparatus may generate a first message comprising one or more headers. The first message may comprise a payload data that comprises information uniquely identifying the first message. The one or more headers may comprise a reply-required indication. The one or more headers may comprise encoded identities for the plurality of target network apparatuses. In particular embodiments, the one or more headers of the first message may comprise a label. A value of the label may correspond to the first network apparatus. The reply-required indication may be encoded in the value of the label.

Figure 4:
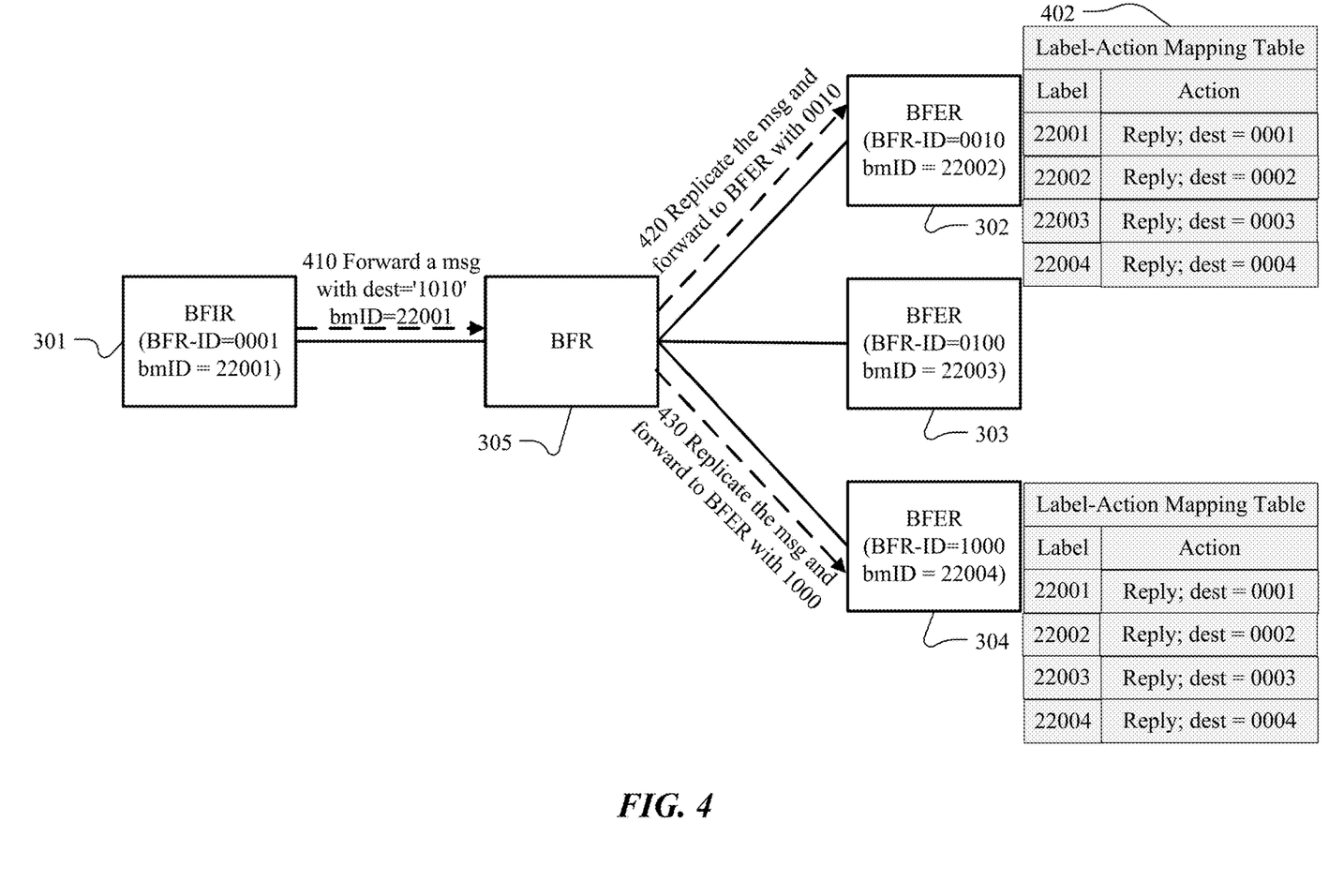
FIG. 4 illustrates an example failure detection using BIER.

FIG. 4 illustrates an example failure detection using BIER. As an example and not by way of limitation, illustrated in FIG. 4, each edge BFR (BFIR/BFER) may be associated with a value of a label, such as BIER-Multiprotocol Label Switching (MPLS)-Identifier (bmID) Label. The label may be locally unique. In particular embodiments, the values of the label may be assigned from a globally unique range. The bmID label may be different from BIER-MPLS label that is used to identify that the underlying packet is BIER-encapsulated. Non-edge BFRs are not required to be assigned with a bmID label. In particular embodiments, BFR-Prefix of an edge BFR may be used as the bmID Label. In such a case, upstream assigned lookup for BIER encapsulation may be used. In the example illustrated in FIG. 4, each edge BFR is assigned with bmID from range 2200x. The BFIR 301 is associated with a bmID 22001. The BFER 302 is associated with a bmID 22002. The BFER 303 is associated with a bmID 22003. The BFER 304 is associated with a bmID 22004. The bmID may be included as a sub-Type-Length-Value (TLV) in Sub-TLV Inter-Gateway Protocol (IGP) extensions of a BIER header (not shown in FIG. 2). The BFIR 301 may create an S-BFD echo message with your discriminator and my discriminator as local values. The S-BFD echo message may be a payload of the first message. The BFIR 301 may encapsulate the S-BFD echo message with its own bmID label value. The BFIR 301 may further encapsulate the message with BIER header. The BFIR-id field of the BIER header may be set with the BFR-id of the BFIR 301. The BitString field of the BIER header may be set with a result of bitwise OR operations between the encoded identities for the destination BFERs. In the example illustrated in FIG. 4, the value of the BitString field would be '1010,' a result of bitwise OR operation between the encoded BFR-id of BFER 302 '0010' and the encoded BFR-id of BFER 304 '1000.' If the bmID is locally unique (upstream assigned label), the Proto field of the BIER header is set to 2. If the bmID is globally unique (downstream assigned label), the Proto field of the BIER header is set to 1. Although this disclosure describes creating a message for initiating a failure detection procedure in a particular manner, this disclosure contemplates creating a message for initiating a failure detection procedure in any suitable manner.

In particular embodiments, the first network apparatus 301 may send the first message through the network. The network may be configured to deliver a copy of the first message to each of the plurality of target network apparatuses using a point-to-multipoint packet-forwarding architecture based on the encoded identities for the plurality of target network apparatuses. The first network apparatus may set a timer for a pre-determined duration of time after sending the first message. As an example and not by way of limitation, continuing with a prior example, illustrated in FIG. 4, the BFIR 301 may forward the created message to an intermediate BFR 305 based on a determined forwarding rule at step 410. The bmID label value for the message is '22001,' and the value of the BitString field is '1010.' After forwarding the message, the BFIR 301 may set a timer for a pre-determined amount of time. On receiving the message, the intermediate BFR 305 may determine one or more forwarding paths for the message based on the destination bit string. For each egress link, the BFR 305 may perform a bitwise AND operation between a bit string associated with the egress link and the destination bit string of the message. A bit string associated with the egress link toward the BFER 302 may be '0010.' Thus, the intermediate BFR 305 may perform a bitwise AND operation between '0010' and '1010' for the egress link. Because the result of the AND operation is '0010,' the intermediate BFR 305, at step 420, may replicate the received message and forward the message to BFER 302, which is associated with the encoded BFR-id '0010.' A bit string associated with the egress link toward the BFER 303 may be '0100.' Thus, the BFR 305 may perform a bitwise AND operation between '0100' and '1010' for the egress link. Because the result of the AND operation is NULL, the BFR 305 may not forward the message to BFER 303. A bit string associated with the egress link toward the BFER 304 may be '1000.' Thus, the BFR 305 may perform a bitwise AND operation between '1000' and '1010' for the egress link. Because the result of the AND operation is '1000,' the BFR 305, at step 430, may replicate the received message and forward the message to BFER 302, which is associated with the encoded BFR-id '1000.' Although this disclosure describes delivering a copy of a message for a failure detection to each target network apparatus using a point-to-multipoint packet-forwarding architecture in a particular manner, this disclosure contemplates delivering a copy of a message for a failure detection to each target network apparatus using a point-to-multipoint packet-forwarding architecture in any suitable manner.

In particular embodiments, the second network apparatus 302 may receive the first message from the first network apparatus 301. The second network apparatus 302 may be one of the plurality of target network apparatuses whose identities are encoded in the destination field in the one or more headers of the first message. In particular embodiments, a value of the label may be associated with the first network apparatus 301. The second network apparatus 302 may determine that the one or more headers of the first message comprise a reply-required indication by looking up the value of the label in a label-action mapping table 402. The label-action mapping 402 table may comprise one or more actions corresponding to each label. The one or more actions for the value of the label may comprise generating the second message as a reply to the first message and sending the second message through the network. As an example and not by way of limitation, continuing with a prior example, illustrated in FIG. 4, the BFER 302 receives the message from the BFIR 301. The bmID value associated with the received message is '22001.' The BFER 302 may look-up the bmID value associated with the received message in a label-action mapping table 402. As a result of the look-up, the BFER 302 may determine that a reply message to the received message needs to be sent back. Although this disclosure describes determining that the first message comprises a reply-required indication in a particular manner, this disclosure contemplates determining that the first message comprises a reply-required indication in any suitable manner.

In particular embodiments, the second network apparatus 302 may identify the first network apparatus 301 by looking up the value of the label in the one or more headers of the first message in the label-action mapping table 402. The one or more actions for the value of the label may comprise setting the destination field in the one or more headers of the reply message with an encoded identify of the first network apparatus. As an example and not by way of limitation, continuing with a prior example, illustrated in FIG. 4, the BFER 302 may look-up the value of bmID label of the received message in the label-action mapping table 402. The bmID '22001' associated with the BFIR 301 may be associated with one or more actions. The one or more actions may comprise an instruction to set the BitString field in the BIER header of the reply message with a bit-encoded BFR-id of the BFIR 301 '0001' Although this disclosure describes identifying an identity of an initiator for a failure detection process in a particular manner, this disclosure contemplates identifying an identity of an initiator for a failure detection process in any suitable manner.

In particular embodiments, the second network apparatus 302 may generate a second message comprising a payload and one or more headers. The one or more actions corresponding to a value of the label in the one or more headers of the first message may comprise: (1) preparing a payload of the second message by copying the payload of the first message; (2) encapsulating the payload of the second message with the one or more headers; (3) setting the source field in the one or more headers of the second message with an identity of the second network apparatus 302; and (4) setting the destination field in the one or more headers of the second message with an encoded identity of the first network apparatus 301, wherein the encoded identity of the first network apparatus 301 is provided in the label-actions mapping table 402. After following the instructions for the one or more actions corresponding to the value of the label in the one or more headers of the first message, the payload of the second message may be identical to the payload of the first message. The destination field in the one or more headers of the second message may be set with an encoded identity of the first network apparatus 301. The encoded identify of the first network apparatus may be determined by looking up the value of the label in the one or more headers of the first message in the label-action mapping table 402. The source field of the one or more headers of the second message may be set with an encoded identity of the second network apparatus 302. As an example and not by way of limitation, continuing with a prior example, illustrated in FIG. 4, the BFER 302 may create a message as a reply to the received message from the BFIR 301 by following instructions for the one or more actions corresponding to the bmID value in the received message. The payload of the reply message may be identical to the payload of the received message. The BitString field in the BIER header may be set with '0001,' an encoded BFR-id of the BFIR 301. The BFIR-id field in the BIER header of the reply message may be set with '2,' the BFR-id associated with the BFER 302. Although this disclosure describes creating a reply message to a failure detection initiation message in a particular manner, this disclosure contemplates creating a reply message to a failure detection initiation message in any suitable manner.

In particular embodiments, the second network apparatus 302 may send the second message through the network. The network may be configured to deliver the second message to the first network apparatus 301 using a point-to-multipoint packet-forwarding architecture based on the encoded identity of the first network apparatus. As an example and not by way of limitation, continuing with a prior example, illustrated in FIG. 4, the BFER 302 may forward the reply message to the intermediate BFR 305 based on a forwarding rule. The intermediate BFR 305 may perform, for each available egress link, a bitwise AND between the value of BitString field in the BIER header of the reply message '0001' with a bit string associated with the egress link. The intermediate BFR 305 may forward a copy of the reply message to the BFIR 301. Although this disclosure describes sending a reply message back to the initiator of the failure detection procedure in a particular manner, this disclosure contemplates sending a reply message back to the initiator of the failure detection procedure in any suitable manner.

In particular embodiments, the one or more processors and the one or more computer-readable non-transitory storage media used for executing the procedures at the second network apparatus 302 may belong to one of one or more line cards 101 associated with the second network apparatus 302. Since the procedures performed at the second network apparatus 302 are just data plane procedures, the procedures may be performed at an Application Specific Integrated Circuit (ASIC) associated with a line card 101. Although this disclosure describes procedures at a destination network apparatus in a particular manner, this disclosure contemplates procedures at a destination network apparatus in any suitable manner.

The first network apparatus 301 may receive one or more second messages from one or more of the plurality of target network apparatuses, respectively. Each of the one or more second messages may be generated as a reply to the first message by one of the one or more target network apparatuses. The first message may comprise a payload data with information uniquely identifying the first message. The first network apparatus may determine each of the one or more second messages is a reply to the first message by comparing the payload of the first message with a payload of the second message. As an example and not by way of limitation, continuing with a prior example, the BFIR 301 may receive the reply message from the BFER 302. The BFIR 301 may determine that the received message is a reply to a message sent by the BFIR 301 by comparing S-BFD echo message in the reply message with the S-BFD echo message in the originally sent message. The BFIR 301 may determine the received reply message was sent by the BFER 302 based on a value of the BFR-id field in the BIER header of the received reply message. The BFIR 301 may also receive a reply message from the BFER 304. Although this disclosure describes verifying a received reply message in a particular manner, this disclosure contemplates verifying a received reply message in any suitable manner.

In particular embodiments, the first network apparatus 301 may identify which of the plurality of target network apparatuses failed to respond to the first message based on the received one or more second messages when the timer expires. The first network apparatus may determine a target network apparatus among the plurality of target network apparatuses is not active if the target network apparatus has failed to respond for a pre-determined number of consecutive messages. As an example and not by way of limitation, continuing with a prior example, the BFIR 301 may have not received a reply from the BFER 304 until the timer expires. The BFIR 301 may determine that the BFER 304 has failed to respond to the message sent by the BFIR 301. In particular embodiments, the BFIR 301 may determine that the BFER 304 is not active when the BFER 304 has failed to respond to a message. In particular embodiments, the BFIR 301 may determine that the BFER 304 is not active when the BFER 304 has failed to respond to three messages in a row, where three is a pre-determined number of messages. Although this disclosure describes determining a destination network apparatus is not active in a particular manner, this disclosure contemplates determining a destination network apparatus is not active in any suitable manner.

In particular embodiments, a pre-determined value for the label in the one or more headers of the first message may provide the reply-required indication. The first network apparatus 301 may set the label in the one or more headers of the first message with the pre-determined value, instead of a value corresponding to the first network apparatus 301. As an example and not by way of limitation, BIER_ECHO='12' for the bmID label may be associated with the reply-required indication. When preparing an initiation message, the BFIR 301 may set the bmID label of the message with a value of BIER_ECHO. Although this disclosure describes a particular manner to provide a reply-required indication, this disclosure contemplates a particular manner to provide a reply-required indication in any suitable manner.

In particular embodiments, the value of the label may be the pre-determined value for the reply-required indication. The second network apparatus 302 may determine that the one or more headers of the first message comprise a reply-required indication by determining the value of the label is the pre-determined value for the reply-required indication. The second network apparatus 302 may identify the first network apparatus 301 based on the one or more headers of the first message. The second network apparatus 302 may determine an encoded identity of the first network apparatus 301 from a source field in the one or more headers of the first message. In particular embodiments, the second network apparatus 302 may perform the following actions upon determining the value of the label is the pre-determined value for the reply-required indication: (1) preparing a payload of the second message by copying the payload of the first message; (2) encapsulating the payload of the second message with the one or more headers; (3) setting the source field in the one or more headers of the second message with an identity of the second network apparatus 302; and (4) setting the destination field in the one or more headers of the second message with an encoded identity of the first network apparatus 301, wherein the identity of the first network apparatus 301 is acquired from a source field in the one or more headers of the first message. As an example and not by way of limitation, the BFER 302 may determine that the bmID label of the received message is BIER_ECHO. in particular embodiments, the BFER 302 may look-up BIER_ECHO in the label-actions mapping table 402. The BFER 302 may prepare a reply message by copying the S-BFD echo message in the payload of the received message. The BFER 302 may encapsulate the copied S-BFD echo message by a BIER header. The BFER 302 may set the BFIR-id field of the BIER header with '2,' the BFR-id associated with BFER 302. The BFER 302 may set the BitString field of the BIER header with '0001,' a bit string encoded BFR-id of the BFIR 301. The BFR-id of the BFIR 301 may be available from the BFIR-id field in the BIER header of the received message from the BFIR 301. Although this disclosure describes preparing a reply message upon receiving an initiation message with a pre-determined reply-required indication in a particular manner, this disclosure contemplates preparing a reply message upon receiving an initiation message with a pre-determined reply-required indication in any suitable manner.

In particular embodiments, the second network apparatus 302 may send the second message through the network. The network may be configured to deliver the second message to the first network apparatus 301 using a point-to-multipoint packet-forwarding architecture based on the encoded identity of the first network apparatus. Although this disclosure describes sending a reply message back in a particular manner, this disclosure contemplates sending a reply message back in any suitable manner.

Figure 5:
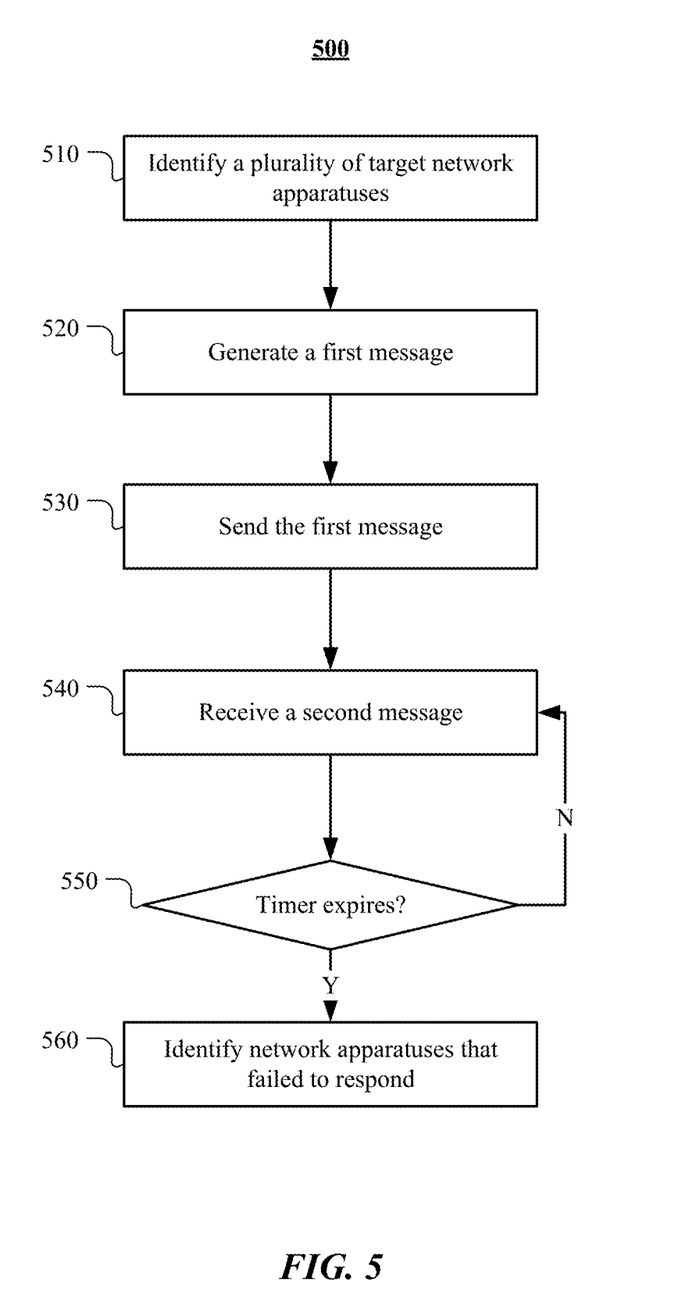
FIG. 5 illustrates an example method for initiating a failure detection in a P2MP forwarding network.

FIG. 5 illustrates an example method 500 for initiating a failure detection in a P2MP forwarding network. The method may begin at step 510, where a first network apparatus may identify a plurality of target network apparatuses within a network to which the first network apparatus belongs. At step 520, the first network apparatus may generate a first message comprising one or more headers. The one or more headers may comprise a reply-required indication and encoded identities for the plurality of target network apparatuses. At step 530, the first network apparatus may send the first message through the network. The network may be configured to deliver a copy of the first message to each of the plurality of target network apparatuses using a point-to-multipoint packet-forwarding architecture based on the encoded identities for the plurality of target network apparatuses. At step 540, the first network apparatus may receive one or more second messages from one or more of the plurality of target network apparatuses, respectively. Each of the one or more second messages may be generated as a reply to the first message by one of the one or more target network apparatuses. At step 550, the first network apparatus may determine whether a timer expires. At step 560, the first network apparatus may identify which of the plurality of target network apparatuses failed to respond to the first message based on the received one or more second messages. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for initiating a failure detection in a P2MP forwarding network including the particular steps of the method of FIG. 5, this disclosure contemplates any suitable method for initiating a failure detection in a P2MP forwarding network including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
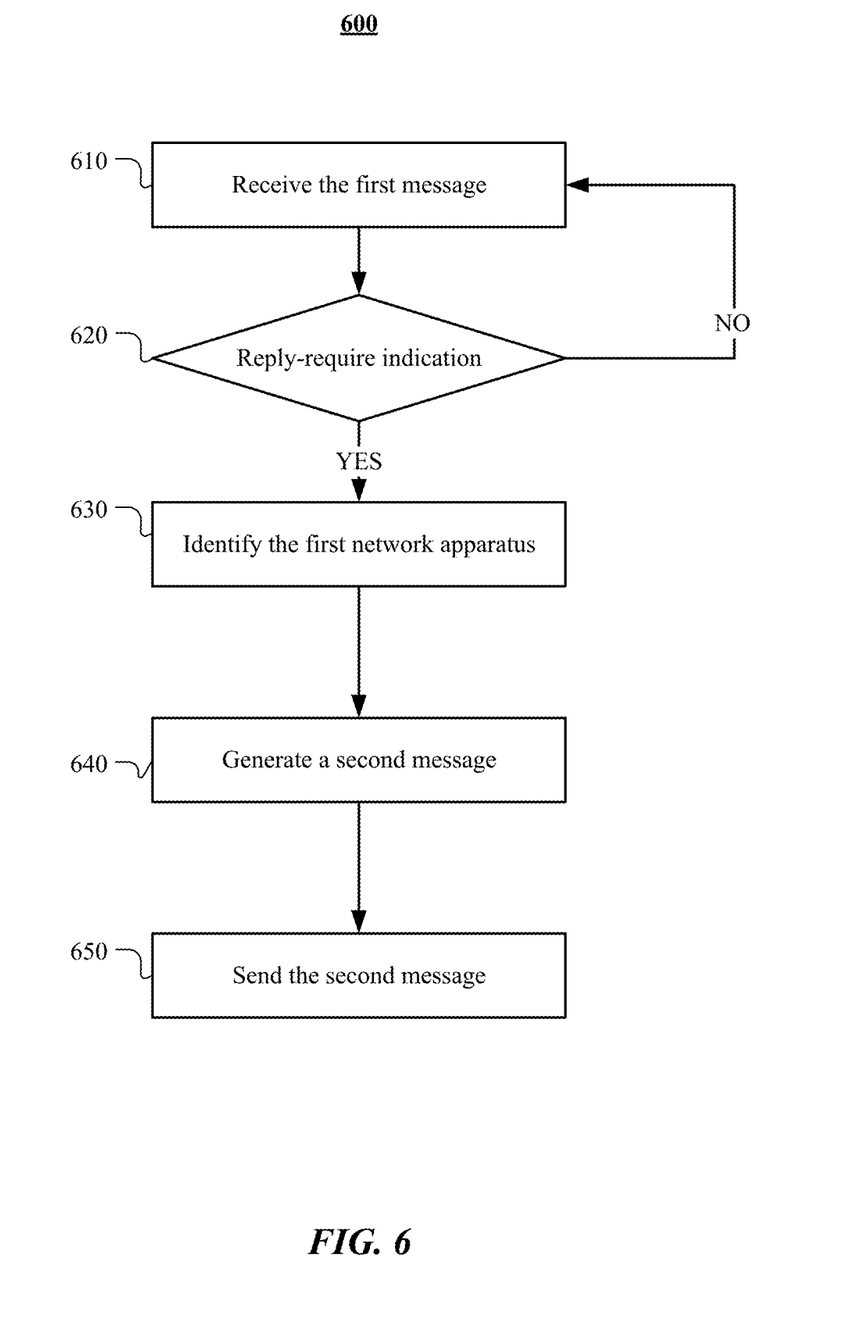
FIG. 6 illustrates an example method for replying to a failure detection initiation message in a P2MP forwarding network.

FIG. 6 illustrates an example method 600 for replying to a failure detection initiation message in a P2MP forwarding network. The method may begin at step 610, where a second network apparatus may receive the first message from the first network apparatus. The first message may comprise one or more headers. The one or more headers may comprise encoded identities for a plurality of target network apparatuses in a network. The plurality of target network apparatuses may comprise the second network apparatus. The network may be configured to deliver the first message to the second network apparatus using a point-to-multipoint packet-forwarding architecture based on encoded identity of the second network apparatus in encoded identities. At step 620, the second network apparatus may determine whether the one or more headers of the first message comprise a reply-required indication. At step 630, the second network apparatus may identify the first network apparatus based on the one or more headers of the first message. At step 640, the second network apparatus may generate a second message comprising a payload and one or more headers. The payload of the second message may be identical to a payload of the first message. A destination field in the one or more headers of the second message may be set with an encoded identity of the first network apparatus. A source field of the one or more headers of the second message may be set with an encoded identity of the second network apparatus. At step 650, the second network apparatus may send the second message through the network. The network may be configured to deliver the second message to the first network apparatus using a point-to-multipoint packet-forwarding architecture based on the encoded identity of the first network apparatus. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for replying to a failure detection initiation message in a P2MP forwarding network including the particular steps of the method of FIG. 6, this disclosure contemplates any suitable method for replying to a failure detection initiation message in a P2MP forwarding network including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
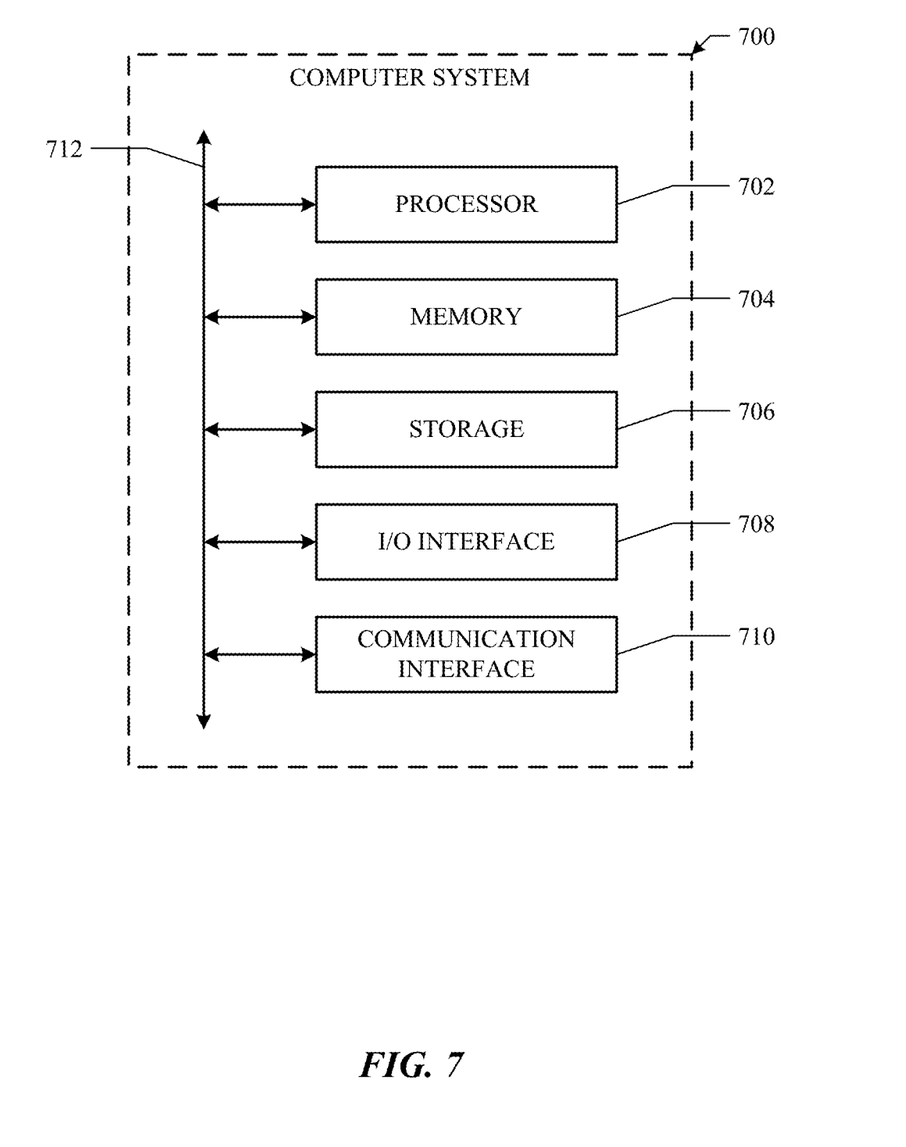
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A first network apparatus, comprising:
   one or more processors; and
   one or more computer-readable non-transitory storage media coupled to the one or more processors and comprising instructions operable when executed by the one or more processors to cause the first network apparatus to:
  identify a plurality of target network apparatuses within a network to which the first network apparatus belongs;
  generate a first message comprising one or more headers, wherein the one or more headers comprise:
    a reply-required indication; and
    encoded identities for the plurality of target network apparatuses;
  send the first message through the network, wherein the network is configured to deliver a copy of the first message to each of the plurality of target network apparatuses using a point-to-multipoint packet-forwarding architecture based on the encoded identities for the plurality of target network apparatuses, wherein the first message comprises a payload data, and wherein the payload data comprises information that uniquely identifies the first message;
  receive one or more second messages from one or more of the plurality of target network apparatuses, respectively, wherein each of the one or more second messages is generated as a reply to the first message by one of the one or more target network apparatuses;
  determine that each of the one or more second messages is a reply to the first message by comparing the payload of the first message with a payload of the second message; and
  identify, based on the received one or more second messages, which of the plurality of target network apparatuses failed to respond to the first message.

2. The first network apparatus of claim 1, wherein the one or more headers of the first message comprise a label.

3. The first network apparatus of claim 2, wherein the reply-required indication is encoded into a pre-determined value for the label.

4. The first network apparatus of claim 2, wherein a value of the label corresponds to the first network apparatus, and wherein the reply-required indication is encoded in the value of the label.

5. The first network apparatus of claim 1, wherein the one or more processors are further operable when executing the instructions to set a timer for a pre-determined duration of time after sending the first message, wherein identifying which of the plurality of target network apparatuses failed to respond to the first message occurs when the timer expires.

6. The first network apparatus of claim 5, wherein the one or more processors are further operable when executing the instructions to determine a target network apparatus among the plurality of target network apparatuses is not active on detecting that the target network apparatus has failed to respond for a pre-determined number of consecutive messages.

7. The first network apparatus of claim 1, wherein the point-to-multipoint architecture is Bit Index Explicit Replication (BIER), wherein an identity of a network apparatus is encoded into a unique bit-string, and wherein identities of the plurality of target network apparatuses are encoded into a destination field in the one or more headers of the first message with bitwise-OR operations between the bit-strings corresponding to the plurality of target network apparatuses.

8. The first network apparatus of claim 1, wherein the first network apparatus is an operations, administration and maintenance (OAM) server.

9. A second network apparatus, comprising:
  one or more processors; and
  one or more computer-readable non-transitory storage media coupled to the one or more processors and comprising instructions operable when executed by the one or more processors to cause the second network apparatus to:
    receive a first message from a first network apparatus, wherein the first message comprising one or more headers, wherein the one or more headers comprise encoded identities for a plurality of target network apparatuses in a network, wherein the plurality of target network apparatuses comprise the second network apparatus, wherein the network is configured to deliver the first message to the second network apparatus using a point-to-multipoint packet-forwarding architecture based on encoded identity of the second network apparatus in the encoded identities, and wherein the one or more headers comprise a label;
    determine that the one or more headers of the first message comprise a reply-required indication by looking up the value of the label in a label-action mapping table, wherein the label-action mapping table comprises one or more actions for each label, and wherein the one or more actions for the value of the label comprise generating the second message as a reply to the first message and sending the second message through the network;
    identify the first network apparatus based on a value of the label in the one or more headers of the first message;
    generate a second message comprising a payload and one or more headers, wherein the payload of the second message is identical to a payload of the first message, wherein a destination field in the one or more headers of the second message is set with an encoded identity of the first network apparatus, and wherein a source field of the one or more headers of the second message is set with an encoded identity of the second network apparatus; and
    send the second message through the network, wherein the network is configured to deliver the second message to the first network apparatus using a point-to-multipoint packet-forwarding architecture based on the encoded identity of the first network apparatus.

10. The second network apparatus of claim 9, wherein the one or more headers of the first message comprise a label, wherein determining that the one or more headers of the first message comprise a reply-required indication comprises determining a value of the label is a pre-determined value for the reply-required indication.

11. The second network apparatus of claim 10, wherein identifying the first network apparatus based on the one or more headers of the first message comprises determining an encoded identity of the first network apparatus from a source field in the one or more headers of the first message.

12. The second network apparatus of claim 9, wherein identifying the first network apparatus based on a value of the label in the one or more headers of the first message comprises looking up the value of the label in the label-action mapping table, and wherein the one or more actions for the value of the label comprise setting the destination field in the one or more headers of the second message with an encoded identify of the first network apparatus.

13. The second network apparatus of claim 9, wherein the one or more processors and the one or more computer-readable non-transitory storage media belong to one of one or more line cards associated with the second network apparatus.

14. A method by a first network apparatus, comprising:
identifying a plurality of target network apparatuses within a network to which the first network apparatus belongs;
generating a first message comprising one or more headers, wherein the one or more headers comprise:
a reply-required indication; and
encoded identities for the plurality of target network apparatuses;
sending the first message through the network, wherein the network is configured to deliver a copy of the first message to each of the plurality of target network apparatuses using a point-to-multipoint packet-forwarding architecture based on the encoded identities for the plurality of target network apparatuses, wherein the first message comprises a payload data, and wherein the payload data comprises information that uniquely identifies the first message;
receiving one or more second messages from one or more of the plurality of target network apparatuses, respectively, wherein each of the one or more second messages is generated as a reply to the first message by one of the one or more target network apparatuses;
determining that each of the one or more second messages is a reply to the first message by comparing the payload of the first message with a payload of the second message; and
identifying, based on the received one or more second messages, which of the plurality of target network apparatuses failed to respond to the first message.

15. The method of claim 14, wherein the one or more headers comprise a label.

* * * * *